(12) United States Patent
Svejkovksy et al.

(10) Patent No.: US 6,415,911 B1
(45) Date of Patent: Jul. 9, 2002

(54) DIFFERENTIAL IMPULSE CONVEYOR ASSEMBLY AND METHOD

(75) Inventors: P. Blake Svejkovksy, Coppell; Paul A. Svejkovksy, Marquez, both of TX (US)

(73) Assignee: Paul A. Svejkovsky, Marquez, TX (US)

( * ) Notice: Subject to any disclaimer, the term of this patent is extended or adjusted under 35 U.S.C. 154(b) by 0 days.

(21) Appl. No.: 09/411,791

(22) Filed: Oct. 1, 1999

(51) Int. Cl.[7] .............................................. B65G 25/04
(52) U.S. Cl. ................................................. 198/750.1
(58) Field of Search ........................ 198/750.1, 752.1, 198/759, 761, 762, 764

(56) References Cited

U.S. PATENT DOCUMENTS

| | | | | |
|---|---|---|---|---|
| 4,556,141 A | * | 12/1985 | Faitel ........................ | 198/750 |
| 4,998,860 A | * | 3/1991 | Dehne ..................... | 414/750 X |
| 5,054,605 A | * | 10/1991 | Bavis ........................ | 198/750 |
| 5,409,101 A | * | 4/1995 | Ahmed et al. .............. | 198/750 |
| 5,690,567 A | * | 11/1997 | DeNijs et al. ............ | 474/73 X |
| 5,794,757 A | * | 8/1998 | Svejkovsky et al. . | 198/750.8 X |
| 5,842,678 A | * | 12/1998 | Svejkovsky ............. | 248/650 X |
| 5,850,906 A | * | 12/1998 | Dean .................... | 198/750.8 X |
| 5,979,640 A | * | 11/1999 | Horton .................... | 198/770 X |

* cited by examiner

*Primary Examiner*—Christopher P. Ellis
*Assistant Examiner*—Kenneth W. Bower
(74) *Attorney, Agent, or Firm*—Loren G. Helmreich; Browning Bushman P.C.

(57) ABSTRACT

A differential impulse conveyor (10, 10A) for moving goods along a tray (12, 12A) in a forward direction at a first speed and in a rearward direction at a second speed greater than the first speed. A reversible servomotor (14, 14A) may be provided for powering a drive mechanism between the motor shaft (16, 16A) and the tray (12, 12A). The drive mechanism may utilize a rack and pinion assembly (30). An electronic controller (68) may control the rotational speed of motor (14) and reverse the direction of motor rotation. Another embodiment may utilize a drive mechanism including a pair of timing belts (79A, 85A) with ends (83A, 89A) secured to respective links (35A, 48A). A further embodiment illustrated in FIGS. 7 and 8 utilizes a cable and sheave system having a pair of cables (43B, 59B) operatively connected to a reversible motor (14B) for moving the tray (12B) in forward and rearward directions.

37 Claims, 4 Drawing Sheets

DIFFERENTIAL IMPULSE CONVEYOR ASSEMBLY AND METHOD

FIELD OF THE INVENTION

The present invention relates to a differential impulse conveyor assembly and to a method for moving goods along a conveyor tray. More particularly, this invention relates to such an assembly and a method in which a reversible motor is utilized for powering the conveyor tray in a slow forward and fast backward movement.

BACKGROUND OF THE INVENTION

U.S. Pat. No. 5,794,757 discloses a differential impulse conveyor having a generally elongate horizontal or slightly inclined tray or pan for the transport of goods along the tray. The tray is moved slowly forward and is then pulled rearwardly at a high return speed so that the goods slide along the tray, thereby effectively transporting the goods along the conveyor tray. Such differential impulse conveyors are utilized for many applications (such as food handling) when conveyor cleanliness, low noise, and/or minimal product damage are desired.

The '757 patent discloses an electronic controller for controlling the rotational speed of the motor shaft to cause the motor shaft to rotate at a first speed for forward movement of the tray and to rotate at a substantially faster second speed for a faster backward movement of the tray, thereby moving goods along the tray in a forward direction. The motor shaft rotates in a single direction of rotation and the tray is connected to cranks driven by the motor shaft to effect a desired forward and backward movement of the tray. Further, counterweights connected to cranks for such movement are provided out of phase with the conveyor tray movement to reduce undesirable conveyor vibration and/or mechanical knock in the drive system. An electronic controller may repeatedly vary the rotational speed of the motor shaft and is programmable for easily varying the overall speed of the motor and the instantaneous rotational speed of the drive shaft as desired to optimize the movement of the goods along the conveyor tray. The cranks and crank assemblies required as a result of the rotation of the motor shaft in a single rotational direction may be costly and may require substantial maintenance.

One object of the present invention is to provide a conveyor drive mechanism for the tray at a slow-forward and fast-backward movement which substantially reduces or totally eliminates the utilization of cranks, crank assemblies and eccentric movements.

SUMMARY OF THE INVENTION

The present invention is directed to a differential impulse conveyor having a conveyor drive mechanism for a tray for moving goods along the tray in a desired forward and backward movement of the tray. The conveyor drive mechanism utilizes a reversible motor for rotating the motor shaft in opposed directions of rotation. An electronic controller for the motor effects rotation of the motor shaft in one direction at one speed and rotation of the motor shaft in an opposite direction at a different speed, thereby providing a slow forward linear movement of the tray during one time or half cycle, and a fast return or rearward movement of the tray during a second time or half cycle.

The drive mechanism between the motor shaft and the tray to provide the forward and backward linear movement of the tray is illustrated by several embodiments. A first embodiment of the invention utilizes a rack and pinion assembly in which the pinion is mounted between an upper rack and a lower rack with the upper rack secured to the tray. A sprocket and sprocket chain between the motor and pinion results in a forward and backward movement of the upper rack and tray upon reversal of the rotational direction of the motor shaft. Linkage assemblies support the racks for the desired tray movement. A counterweight may be connected to the lower rack to minimize vibration and knocking.

A second embodiment of the drive mechanism between the motor shaft and the tray provides the desired forward and backward movement of the tray by utilizing a pair of timing belts mounted on support arms or links of upper and lower linkage assemblies. The upper support arm on the upper linkage assembly has one timing belt mounted thereon and is secured to the tray for movement of the tray back and forth. Each timing belt is trained over idler rollers on opposed sides of the sprocket for engaging a respective belt. A counterweight is mounted on the lower linkage assembly which moves in an opposite direction from the tray and upper linkage assembly, thereby minimizing vibration and knock problems. Only a single counterweight is required when embodiments are suggested in view of the two discussed above.

An electronic controller is programmed from a preselected acceleration/deceleration curve. The curve may be provided from a graph which is plotted to set forth the tray travel in inches and the tray velocity in inches per second as a function of the angular position of the motor shaft. The relevant factors include tray travel, tray velocity, tray acceleration, tray deacceleration, and torque exerted by the motor shaft. The controller may be programmed to produce the desired output to the motor for rotating the motor shaft at a first speed in one direction during each first half cycle rotation, and then rotating in the motor shaft in the reverse direction at a second speed greater than the first speed during each second half cycle of rotation. As a result of the reversing the direction of rotation of the motor shaft, a simplified conveyor drive mechanism has been provided for interconnecting the motor shaft with the tray or pan for the desired forward and backward movement. Crank and crank arms assemblies utilized heretofore for the drive mechanism may be eliminated by the present invention.

These and further objects, features, and advantages of the present invention will become apparent from the following detailed description wherein reference is made to the Figures in the accompanying drawings.

DETAILED DESCRIPTION OF PREFERRED EMBODIMENTS

Figure 1:
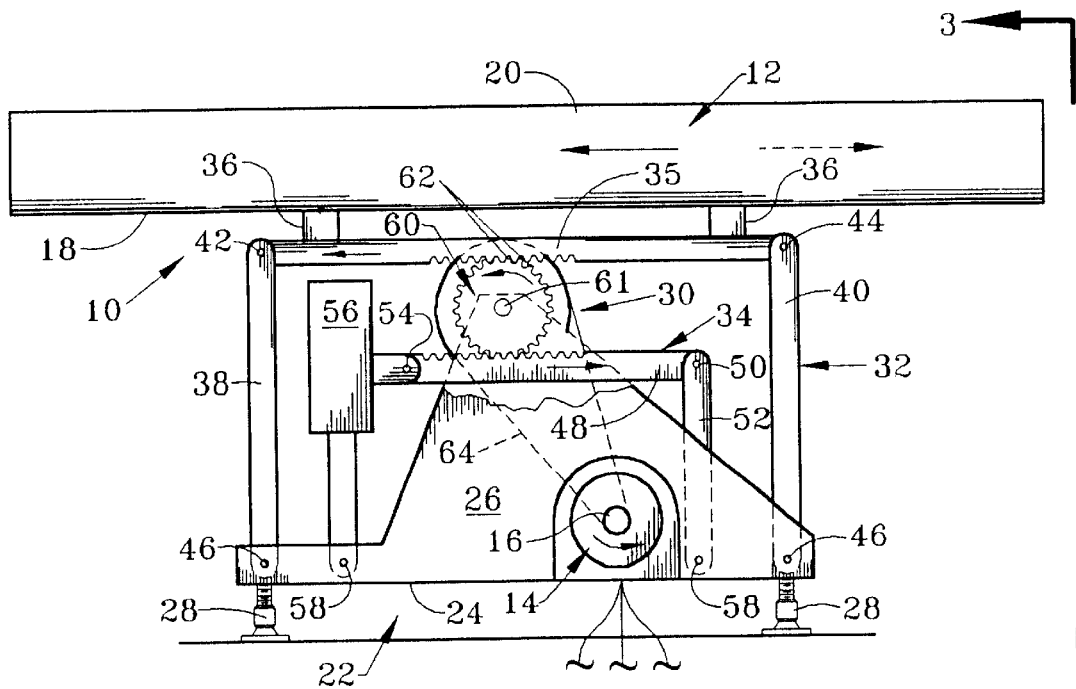
FIG. 1 is a side elevational view of one embodiment of the differential impulse conveyor of the present invention in which a rack and pinion assembly is connected to a reversible motor for moving the tray forward and backward at different speeds for movement of goods along the tray.
Figure 2:
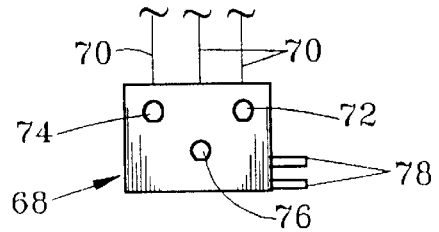
FIG. 2 is a top plan view of the differential impulse conveyor shown in FIG. 1 with a portion of the upper tray broken away.
Figure 2:
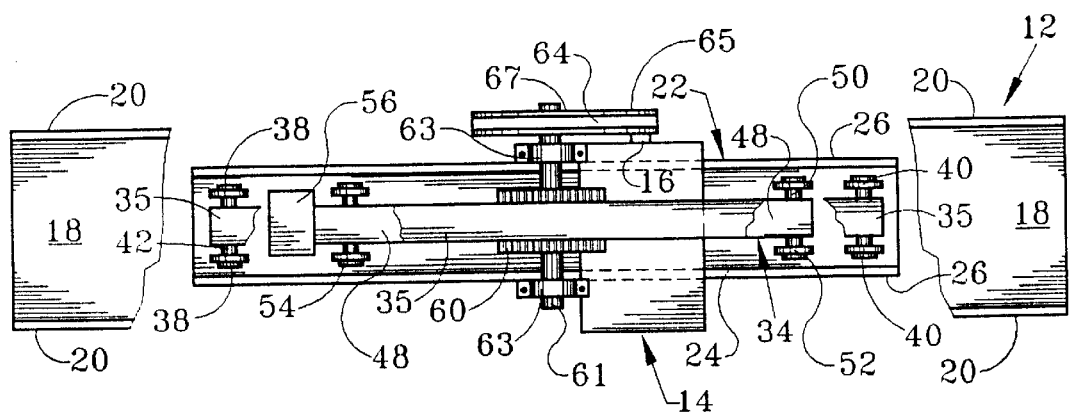
Figure 3:
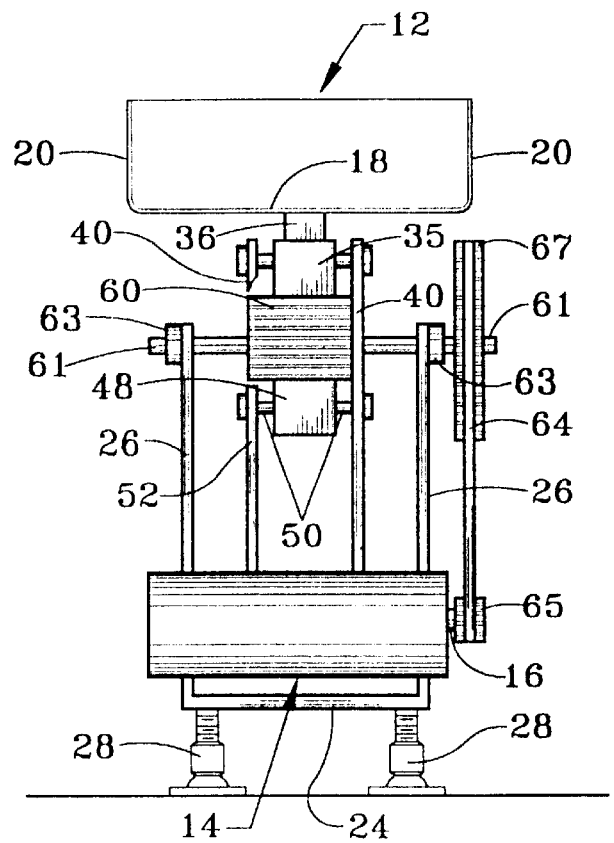
FIG. 3 is a rear elevational view taken generally along line 3—3 of FIG. 1.

Referring now particularly to FIGS. 1–3, one embodiment of a differential impulse conveyor 10 has a tray or pan 12 mounted for movement in a forward direction as indicated by the arrows in FIG. 1 when powered by a reversible electric servomotor 14 having a motor shaft 16 rotating in a counterclockwise direction as shown in FIG. 1. When reversible servomotor 14 is reversed, motor shaft 16 rotates in a clockwise direction as shown in FIG. 1 to move tray 12 in a reverse or backward direction. Tray 12 has a planar bottom 18 with generally vertical sides 20 extending upwardly therefrom.

Differential impulse conveyor 10 causes the tray 12 to move forward so that the products or goods move with the tray, rather than sliding on the supporting surface or bottom 18 of the tray when the tray moves forward. The tray is then pulled backwardly at a fast rate of speed so that the product slides along the tray during the rearward movement of the tray. Thus, the tray moves forward and then moves backward in a rapid accelerating and decelerating fashion upon reversing of the rotation of motor shaft 16. It is understood that the supporting surface or bottom 18 of tray 12 may be slightly inclined or may be horizontal so that goods may be moved generally horizontally and either downhill or uphill.

A support structure 22 for servomotor 14 includes a base 24 having sides 26 extending upwardly therefrom. Adjustable legs 28 extend from base 24 and are supported on a floor or the like. A conveyor drive mechanism extends between the reversible servomotor 14 and tray 12 and may comprise a rack and pinion assembly 30 mounted on an upper linkage assembly 32 and a lower linkage assembly 34. Upper linkage assembly 32 includes an upper horizontal rack 35 secured by posts 36 to tray 12 and pivotally mounted to vertical links 38 and 40 about pivots 42 and 44 on opposite ends of upper rack 35. The lower ends of vertical links 38 and 40 are pivotally mounted at 46 to base 24.

Lower link assembly 34 includes a lower horizontal rack 48 pivotally mounted at 50 to link 52 adjacent one end and pivotally mounted at 54 to a counterweight 56 adjacent the opposite end of rack 48. Link 52 and counterweight 56 are pivotally mounted at 58 to base 24.

A pinion 60 mounted on drive shaft 61 supported on bearings 63 has outer teeth 62 engaging teeth on upper rack 35 and on lower rack 48 for movement of racks 35, 48 forward and backward upon rotation of reversible servomotor 14 in opposite directions. A timing belt 64 extends between sprocket 67 on drive shaft 61 and sprocket 65 on motor shaft 16 for rotation of pinion 60 according to a programmed acceleration/deceleration curve.

The cycle of servomotor 14 may be regulated by controller 68, which in turn may receive signals from position sensors on servomotor 14. Controller 68 outputs electrical power via lines 70 to coils in the servomotor 14. Various controls may be provided for regulating the cycle of servomotor 14. A control adjustment knob 72 may thus be used to control the power to one coil in the motor and thus control the forward speed and the forward acceleration of the tray 12. A similar adjustment knob 74 may be used to control the electrical power to another coil and thereby regulate the velocity and acceleration for reversing the rotational direction of motor shaft 16 and thereby regulate the velocity and acceleration of tray 12 during the return or backward movement of tray 12. For a tray of a given weight, it is envisioned that each of these forward acceleration and backward acceleration curves may be optimized with the controller 68 by reversing the rotational direction of motor shaft 16 to produce the desired velocity or acceleration curve, as discussed more fully in U.S. Pat. No. 5,794,757. A graph plotting the forward and rearward velocity of the conveyor may thus illustrate a sinusoidal motion that provides a relatively slow forward and fast backward movement, with the backward velocity being approximately 2.6 times the maximum forward velocity in order to provide travel rates of goods along the conveyor at speeds of up to 40 feet per minute, for example. A preferred velocity curve for a given tray may also be maximized for a specific tray inclination since the differential impulse conveyor of the present invention may be used to reliably convey goods along the tray regardless of whether the tray 12 is angled slightly downwardly, is horizontal, or is angled slightly upwardly.

Another control knob 76 may be provided for regulating the cycle time of the forward and reverse motions of the conveyor, and thereby regulates the velocity of the goods as they move forward with respect to the reciprocating tray 12. Accordingly, the user may adjust the speed of the goods moving along the tray by regulating the knob 76, with the adjustment knobs 72 and 74 remaining unchanged.

Computer outlets 78 may be provided so that a portable computer controlled by a conventional keyboard may input or retrieve data stored in controller 68, and may alter the operation of controller 68 in response to operator signals. Controller 68 may thus control electrical power along lines 70 which reverse and drive servomotor 14. It should be understood that a separate operator control station for controller 68 may also be provided, if desired. In many applications, the controller 68 as well as the adjustment devices 72, 74 and 76 may be mounted on a panel which may be directly supported by base 24 of the conveyor.

Counterweight 56 connected to lower rack 48 moves in a direction opposite the movement of tray 12. Thus, vibration and knocking resulting from movement of tray 12 is minimized by counterweight 56. If desired, two or more counterweights may be employed.

Figure 6:
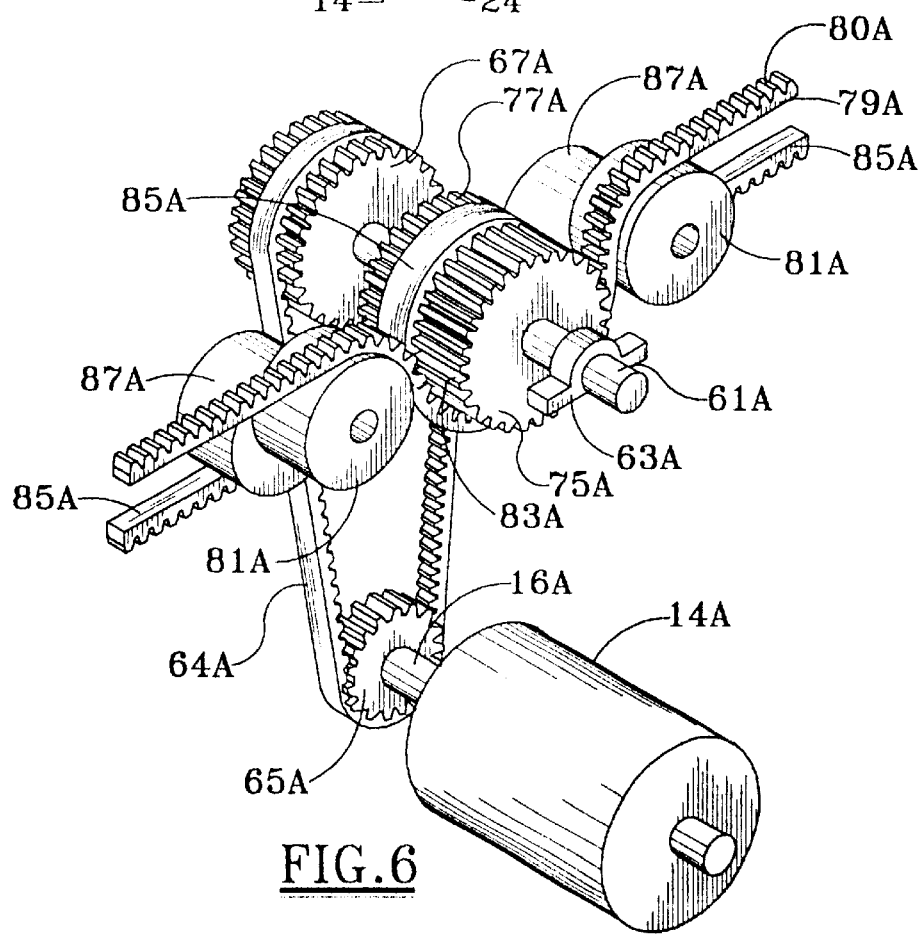
FIG. 6 is a perspective, partly schematic, of the timing belt mechanism for the embodiment shown in FIGS. 4 and 5 removed from the conveyor.
Figure 4:
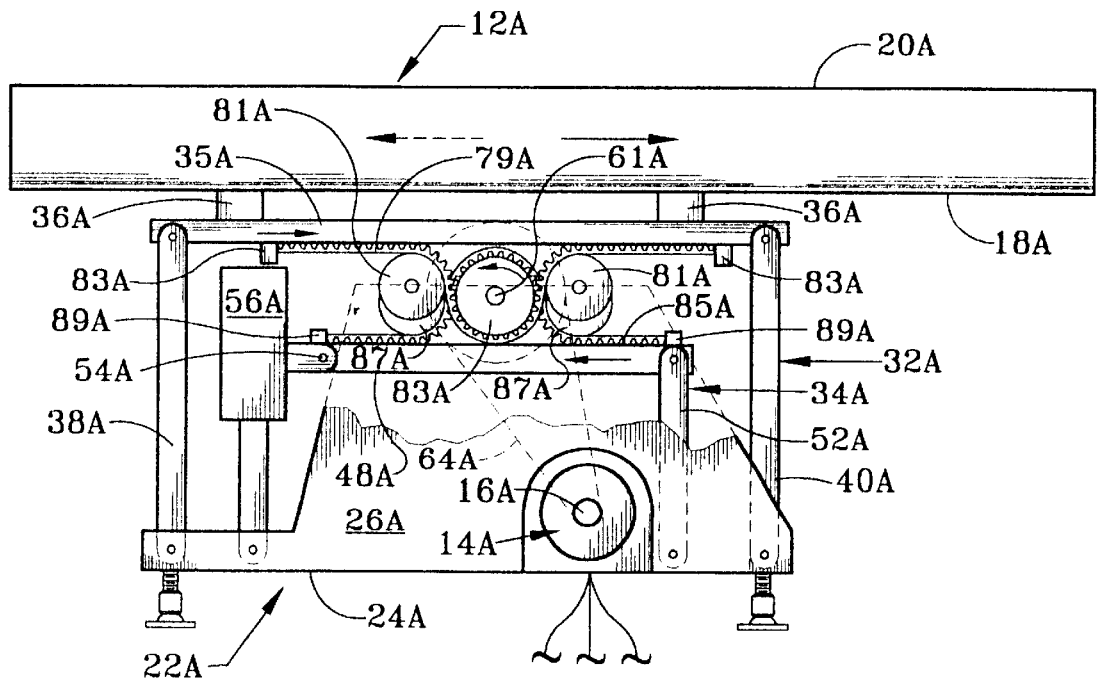
FIG. 4 is a side elevational view of another embodiment of the invention in which a timing belt assembly is connected to a reversible motor for moving the tray forward and backward at different speeds.
Figure 5:
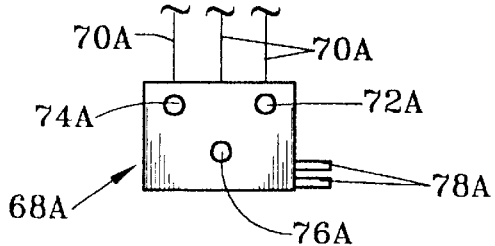
FIG. 5 is a top plan view of the differential impulse conveyor shown in FIG. 4 with a portion of the tray broken away.
Figure 5:
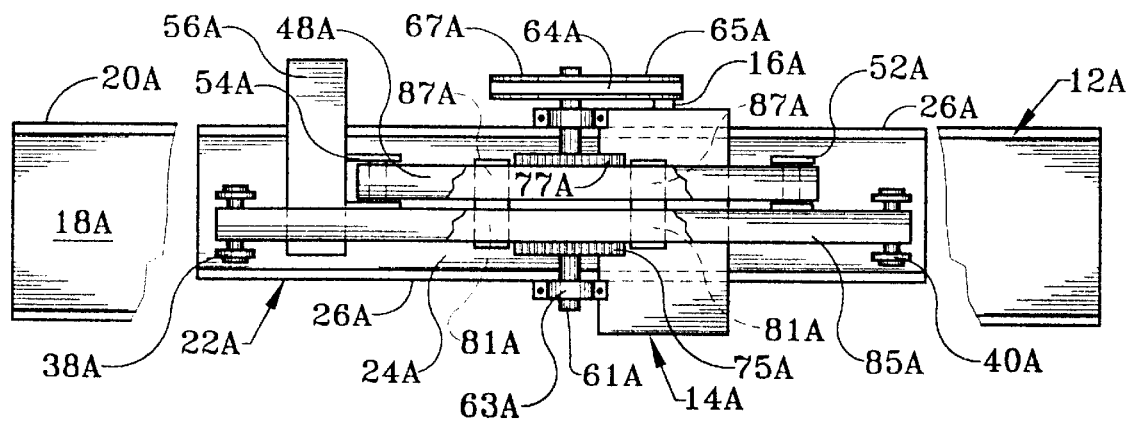

The embodiment of FIGS. 4–6 is directed to a differential impulse similar to the embodiment of FIGS. 1–3, but utilizes a reversible servomotor 14A with a pair of timing belts to provide the desired forward and rearward movement to the tray upon reversing the rotational direction of the reversible servomotor 14A.

Reversible servomotor 14A may be mounted on base 24A of support structure 22A. An upper linkage assembly 32A has an upper generally horizontal link or arm 35A having posts 36A secured to bottom 18A of tray 12A for movement of arm 35A with tray 12A. Tray 12A has vertical sides 20A extending upwardly from bottom 18A. Vertical links 38A, 40A may be pivotally connected to link 35A as in the embodiment of FIGS. 1–3. A lower linkage assembly 34A has an upper horizontal arm or link 48A connected to link 52A and counterweight 56A at 54A, as in the embodiment of FIGS. 1–3. As shown particularly in FIG. 6, drive shaft 61A may be mounted in bearings 63A secured to sides 26A of support structure 22A. A timing belt 64A extends about sprocket 65A on motor shaft 16A and sprocket 67A on drive shaft 61A. Sprocket 67A is normally at least twice the diameter of sprocket 65A so that revolutions of the servomotor 14A are maximized, thereby minimizing the size of the servomotor 14A for providing the required torque to drive tray 12A.

Mounted on drive shaft 61A are two timing gears 75A and 77A. A timing belt 79A having teeth 80A thereon is trained over idler rollers 81A and engages teeth 83A on timing gear 75A in a timed relation. Opposite ends 83A of timing belt 79A are secured to arm 35A. Timing belt 85A is trained under idler rollers 87A and engages timing gear 77A. The opposed ends 89A of timing belt 85A are secured to link or arm 48A. As shown in FIG. 4, rotation of servomotor 14A in a counterclockwise direction moves arm 35A and tray 12A to the right. Upon reversal of the direction of rotation of motor shaft 16A to a clockwise direction, arm 35A and tray 20A move to the left as viewed in FIG. 4. To control the cycling of servomotor 14A, a controller 68A similar to controller 68 of the embodiment shown in FIGS. 1–3 may be provided along with suitable control knobs 72A, 74A, 76A and computer outlets 78A as in the embodiment of FIGS. 1–3.

The timing belt arrangement shown in FIGS. 4–6 may eliminate the lubrication and possible backlash problems that may be associated with the rack and pinion arrangement shown in FIGS. 1–3. Further, fabrication costs are minimized with the timing belt arrangement shown in FIGS. 4–6.

As a result of providing a reversible motor to reverse the direction of rotation of the motor shaft, the utilization of cranks, crank assemblies, and eccentric motions as required for motors having a single direction of rotation may be eliminated.

Figure 7:
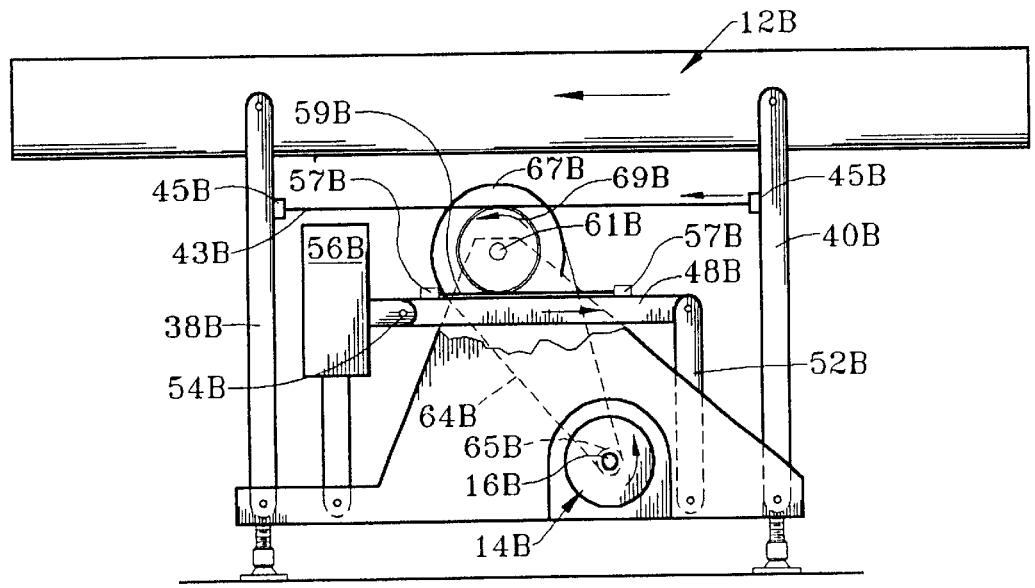
FIG. 7 is a side elevational view of a further embodiment of the invention in which a cable and sheave system is connected to a reversible motor for moving the tray forward and backward at different speeds.
Figure 8:
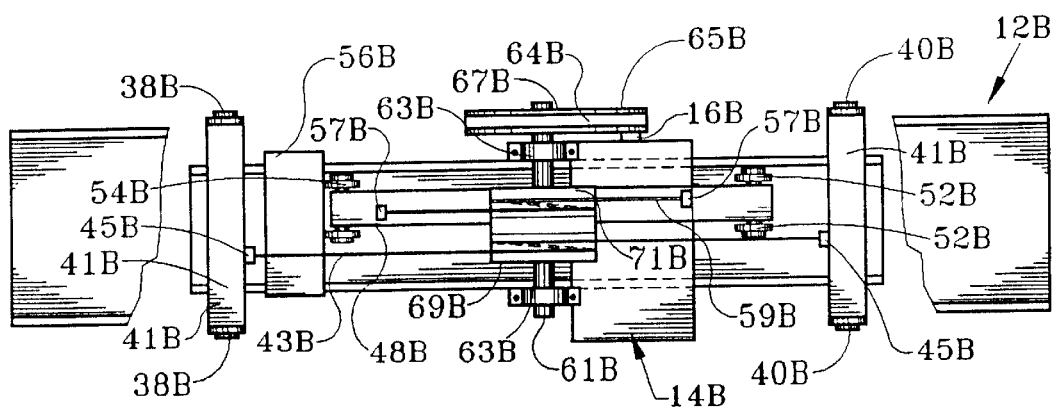
FIG. 8 is a top plan of the differential impulse conveyor shown in FIG. 7 and illustrating the cable and sheave system.

Referring now to FIGS. 7 and 8, another embodiment of the invention is shown in which a cable and sheave system is illustrated for converting the rotary motion of servomotor 14B in a reciprocating motion to drive tray 12B and counterweight 56B. Servomotor 14B has a motor shaft 16B and a sprocket 65B secured to shaft 16B. A timing belt 64B may be mounted between sprocket 65B and sprocket 67B, which is secured to drive shaft 61B mounted in bearings 63B. A pair of pulleys 69B and 71B are secured to shaft 61B. A cable mounting bar 41B may be mounted between links 38B and between links 40B. A tray cable 43B may be secured at its ends to cable attachments 45B on bars 41B. Tray cable 43B is wound about pulley 69B and, upon rotation of drive shaft 61B in a counterclockwise direction viewing FIG. 7, the upper ends of links 38B and 40B along with tray 12B pivotally connected to links 38B, 40B move to the left.

Generally vertical links 52B may be pivotally connected at their upper end to horizontal link 48B which is pivotally connected at 54B to a counterweight 56B. Cable attachments 57B may be mounted on horizontal link 48B and a counterweight cable 59B is secured at its ends to cable attachments 57B. Cable 59B extends about pulley or sheave 71B and, upon rotation of drive shaft 61B in a counterbalance direction viewing FIG. 7, horizontal link 48B and counterweight 56B move to the right. Thus, since cables 43B and 59B are wound in opposite directions on sheaves 69B and 71B, tray 12B and counterweight 56B move in opposite directions, thereof balancing the system. When tray 12B has traveled the desired distance, motor 14B and thus motor shafts 16B are reversed and tray 12A is pulled in an opposite direction by tray cable 43B. To maintain cables 43B and 59B taut, suitable springs may be connected to cables 43B and 59B. Motor 14B is programmed to provide a desired slow-forward, fast-rearward motion suitable for a linear motion conveyor.

While cables have been illustrated in the drawings for movement of the tray and counterweight, it is understood that other flexible members, such as flat bands or belts, may be utilized if desired in lieu of cables. These flexible members may be fabricated from steel, nylon or other high strength pliable material. Short stiff springs may be connected to suitable attachment points to maintain a desired tension on the belts and compensate for wear. Also, any type of programmable reversible motor may be utilized with the present invention including, but not limited to, stepper, pneumatic, or hydraulic motors. Further, while the reciprocating mechanism for the various embodiments shown in the drawings have been illustrated for utilization with a motor shaft extending axially in a horizontal direction, it is understood that the drive motor and motor shaft may be arranged with the motor shaft extending axially in a generally vertical or inclined direction, if desired, thereby minimizing the horizontal space required for the motor and motor shaft.

In addition, while conventional timing belt drives have been illustrated in the drawings for transmitting or transferring power from the motor shaft to the tray, other suitable types of power transmitting arrangements may be utilized, such as a zero backlash worm gear drive. Such a worm gear drive reduces the size of the motor required by providing a high speed reduction ratio. Also, a worm gear drive could inherently provide a braking effect to reduce the load on the motor.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A differential impulse conveyor for moving goods, comprising:
   a tray movable in a forward direction at a first speed and in a backward direction at a second speed greater than the first speed to move goods along the tray in a forward direction, the tray having a tray floor for supporting the goods thereon;
   a reversible drive motor having a rotating motor shaft;
   a drive connection between said motor shaft and said tray to move said tray in a forward direction upon rotation of said motor shaft in a forward direction, and to move said tray in a backward direction upon rotation of said motor shaft in an opposite backward direction, the rotational speed of said motor shaft in said backward direction being greater than the rotational speed of said motor shaft in said forward direction and
   an electronic controller for reversing the rotation of said reversible motor and for controlling the rotational speed of the motor shaft to rotate the motor shaft at a faster speed during rotation of said motor shaft in the backward direction than during rotation of said motor shaft in the opposed forward direction to move said tray in the backward direction at a faster speed than in the forward direction.

2. The differential impulse conveyor as defined in claim 1, further comprising:
   a linkage structure between said drive motor and said tray, said linkage structure supporting said tray for forward and backward movements, said linkage structure including an upper generally horizontal link secured to said tray for movement therewith, and a pair of generally vertically extending links pivotally secured to said generally horizontal link.

3. The differential impulse conveyor as defined in claim 1, further comprising:

a linkage structure between said drive motor and said tray, said linkage structure supporting said tray for forward and backward movements, said linkage structure including a pair of linkage assemblies including an upper linkage assembly and a lower linkage assembly each including a generally horizontal link and a pair of generally vertical connecting links pivotally connected to said horizontal link; and an actuating structure between each horizontal link of said pair of linkage assemblies and connected to each said motor shaft, said actuating structure operatively connected to each said horizontal links for movement of said pair of linkage assemblies simultaneously in opposite directions.

4. The differential impulse conveyor as defined in claim 3, wherein said actuating structure comprises:

a rack and pinion assembly between the generally horizontal links of said upper and lower linkage assemblies, said horizontal links forming rack members; and a pinion between said rack members and connected to said motor shaft in a driven relation for actuation of said rack and pinion assembly for movement of said tray in the forward direction and the rearward direction.

5. The differential impulse conveyor as defined in claim 3, wherein said actuating structure comprises:

a pair of flexible timing members and a sprocket for said flexible timing members, one of said flexible timing members having opposed ends secured to said upper linkage assembly and the other of the pair of flexible timing members having opposed ends secured to said lower linkage assembly, said sprocket being driven by said motor shaft for movement of said linkage assemblies and said tray.

6. The differential impulse conveyor as defined in claim 5, further comprising:

a pair of idler rollers for each flexible timing member and mounted on opposed sides of said sprocket.

7. The differential impulse conveyor as defined in claim 1, further comprising:

at least one counterweight connected to the lower linkage assembly and driven by the said drive motor, the at least one counterweight moving in a backward direction when the tray moves in a forward direction.

8. The differential impulse conveyor as defined on claim 1, further comprising:

a linkage structure between said drive motor and said tray including a pair of links operatively connected to said tray to support said tray for forward and backward movements;

said drive connection including a drive shaft driven by said motor shaft and a pulley operatively connected to said drive shaft for rotation therewith; and a flexible member wound about said pulley and having opposite ends secured to said pair of links whereby rotation of said drive shaft effects movement of said links and tray.

9. The differential impulse conveyor as defined in claim 8, wherein said links have upper ends pivotally mounted to said tray and lower ends mounted for pivotal movement about fixed pivots, whereby movement of said flexible member effects pivotal movement of said links about said fixed pivots and linear movement of said tray.

10. The differential impulse conveyor as defined in claim 1, further comprising:

a linkage structure between said drive motor and said tray;

a counterweight having a lower end connected about a fixed pivot and pivotally connected to said linkage structure;

said drive connection including a drive shaft driven by said motor shaft and a pulley operatively connected to said drive shaft for rotation therewith; and a flexible member wound about said pulley and having opposite ends thereof secured to a generally horizontal link whereby rotation of said drive shaft effects movement of said horizontal link and counterweight.

11. A method of moving goods along a tray by forward and backward movements of the tray with movement of the tray in a forward direction being slower than movement of the tray in a rearward direction, said method comprising:

providing a linkage structure defining an upper linkage assembly and a lower linkage assembly arranged for simultaneous movement in opposite directions with each linkage assembly having an upper generally horizontal link;

mounting said tray on the upper horizontal link of said upper linkage assembly;

mounting an actuating structure between the upper horizontal links of said lower and upper linkage assemblies;

mounting a drive member between a reversible motor and said actuating structure for simultaneous movement of said linkage assemblies in opposite directions and movement of said tray in a forward direction upon rotation of said motor in a forward direction; and reversing the rotation of said motor to a rearward direction for reversing the simultaneous movement of said linkage assemblies in opposite directions for movement of said tray in the rearward direction.

12. The method as defined in claim 11, wherein mounting an actuating structure includes mounting a rack and pinion assembly between the upper generally horizontal links of said lower and upper linkage assemblies.

13. The method as defined in claim 11, wherein mounting an actuating structure includes mounting a pair of timing belts and an associated sprocket between the upper generally horizontal links of said lower and upper linkage assemblies.

14. The method as defined in claim 13, wherein mounting an actuating structure includes mounting opposite ends of one timing belt on the generally horizontal link of one linkage assembly and mounting opposite ends of another timing belt on the generally horizontal link of the other linkage assembly with said sprocket engaging the timing belts intermediate the ends of said belts.

15. The method as defined in claim 11, further comprising:

mounting at least one counterweight driven by said motor.

16. A method of moving goods along a tray by forward and backward movements of the tray with movement of the tray in a forward direction being slower than movement of the tray in a rearward direction, said method comprising:

providing a reversible drive motor having a rotating motor shaft;

moving said tray in response to said drive motor in a forward direction upon rotation of said motor shaft in a forward direction, and moving said tray in response to said drive motor in a backward direction upon rotation of said motor shaft in an opposite backward direction; and maintaining the rotational speed of the motor shaft in said backward direction greater than the rotational speed of said motor shaft in said forward direction.

17. The method as defined in claim 16, further comprising:

providing an electronic controller for automatically reversing the rotation of said reversible motor and controlling the rotational speed of the motor shaft.

18. The method as defined in claim 16, further comprising:

providing a linking structure between said drive motor and said tray to support said tray for forward and backward movements, said linking structure including an upper generally horizontal link secured to said tray for movement therewith and a pair of generally vertically extending links pivotally connected to said generally horizontal link.

19. The method as defined in claim 16, further comprising:

providing a linkage structure between said drive motor and said tray to support said tray for forward and backward movements, said linkage structure including a pair of linkage assemblies including an upper linkage assembly and a lower linkage assembly each including a generally horizontal drive member and a pair of generally vertical connecting links pivotally connected to said drive member; and providing an actuating structure between said horizontal drive members and connected to said motor shaft to operatively connect said upper and lower linkage assemblies for movement simultaneously in opposite directions.

20. The method as defined in claim 19, wherein providing said actuating structure includes mounting a rack and pinion assembly between the upper generally horizontal drive members of said lower and upper linkage assemblies.

21. The method as defined in claim 19, wherein providing the actuator structure includes mounting a pair of timing belts and an associated sprocket between the upper generally horizontal drive members of said upper and lower linkage assemblies.

22. The method as defined in claim 16, further comprising:

providing a linkage structure between said drive motor and said tray to support said tray for forward and rearward movements, said linkage structure including an upper linkage assembly having a pair of spaced generally vertical links connected to said tray;

connecting the opposed ends of a flexible member to said generally vertical links;

winding said flexible member about a pulley; and rotating said pulley for moving said links and tray connected thereto to effect linear movement of said tray.

23. The method as defined in claim 16, further comprising:

providing a linkage structure between said drive motor and said tray to support said tray for forward and rearward movements, said linkage structure including a generally horizontal link and a counterweight pivotally connected to said generally horizontal link;

securing the opposed ends of a flexible member to said generally horizontal link;

winding said flexible member about a pulley; and rotating said pulley for moving said horizontal link in a linear direction to move said counterweight.

24. A differential impulse conveyor for moving goods, comprising:

a tray movable in a forward direction at a first speed and in a backward direction at a second speed greater than the first speed to move goods along the tray in a forward direction, the tray having a tray floor for supporting the goods thereon;

a drive motor for powering the moveable tray;

a drive connection between said motor and said tray to move said tray in a forward direction and in a backward direction;

the drive connection including a linkage structure connected to said tray for forward and backward movements, said linkage structure including an upper linkage assembly and a lower linkage assembly, each linkage assembly including a generally horizontal drive member and a pair of generally vertical connecting links connected to said drive member; and an actuating structure between the generally horizontal drive members and powered by the motor, the actuating structure operatively connected to simultaneously move said generally horizontal drive members in opposite directions.

25. The differential impulse conveyor as defined in claim 24, wherein said drive connection comprises:

a rack and pinion assembly between the generally horizontal drive members of the upper and lower linkage assemblies, the generally horizontal drive members supporting rack members; and a pinion between the said rack members and powered by the motor shaft for actuation of said rack and pinion assembly to move the tray in a forward direction and the rearward direction.

26. The differential impulse conveyor as defined in claim 24, wherein said drive connection comprises:

a pair of flexible timing members and a sprocket, one of said flexible timing members having opposed ends secured to said upper linkage assembly and the other of the pair of flexible timing members having opposed ends to said lower linkage assembly, said sprocket being driven by said motor for movement of said linkage assemblies and said tray.

27. The differential impulse conveyor as defined in claim 24, further comprising:

at least one counterweight connected to the lower linkage assembly, the at least one counterweight moving in a backward direction when the tray moves in a forward direction.

28. The differential impulse conveyor as defined on claim 24, wherein said drive connection comprises:

a drive shaft driven by said motor and a pulley operatively connected to said drive shaft for rotation therewith; and said generally horizontal drive member of said upper linkage assembly includes a flexible member wound about at least a portion of said pulley whereby rotation of said drive shaft effects movement of said tray.

29. The differential impulse conveyor as defined in claim 28, wherein said flexible member is one of a timing belt and a cable, and wherein said generally horizontal drive member of said lower linkage assembly includes another flexible member powered by rotation of the drive shaft.

30. The differential impulse conveyor as defined in claim 24, further comprising:

a counterweight having a lower end connected about a fixed pivot and pivotally connected to said lower linkage assembly;

said drive connection including a drive shaft drive by said motor and a pulley operatively connected to said drive shaft for rotation therewith; and a flexible member wound about said pulley and having an opposite end thereof secured to the generally horizontal drive member of the lower linkage assembly whereby rotation of said drive shaft effects movement of the counterweight.

31. A differential impulse conveyor for moving goods, comprising:

a tray movable relative to a base in a forward direction at a first speed and in a backward direction at a second speed greater than the first speed to move goods along the tray in a forward direction, the tray having a tray floor for supporting the goods thereon;

a reversible drive motor secured to the base and having a rotating motor shaft;

a direct drive connection between said motor shaft and said tray to move said tray in a forward direction upon rotation of said motor shaft in a forward direction, and to move said tray in a backward direction upon rotation of said motor shaft in an opposite backward direction, the rotational speed of said motor shaft in said backward direction being greater than the rotational speed of said motor shaft in said forward direction, said drive connection including a driven shaft rotatable about a driven shaft axis stationary with the base and powered by the drive motor, and a connector interconnecting the driven shaft and the tray; and a counterweight having a lower end pivotal with respect to the base and moveable in response to rotation of the driven shaft.

32. The differential impulse conveyor as defined in claim 31, further comprising:

a linkage structure between said drive motor and said tray, said linkage structure supporting said tray for forward and backward movements, said linkage structure including an upper generally horizontal link secured to said tray for movement therewith, and a pair of generally vertically extending links pivotally secured to said generally horizontal link.

33. The differential impulse conveyor as defined on claim 31, further comprising:

a pulley operatively connecting to motor shaft for rotation therewith; and a flexible member wound about said pulley and having opposite ends secured to said driven shaft whereby rotation of said motor shaft effects movement of the tray.

34. The differential impulse conveyor as defined in claim 33, wherein said links have upper ends pivotally mounted to said tray and lower ends mounted for pivotal movement about fixed pivots, whereby movement of said cable effects pivotal movement of said links about said fixed pivots and linear movement of said tray.

35. The differential impulse conveyor as defined in claim 31, wherein said connector includes a rack pinion assembly powered by the driven shaft and interconnecting the driven shaft with both the tray and the counterweight.

36. The differential impulse conveyor as defined in claim 31, wherein the connector includes a timing belt assembly powered by the driven shaft and interconnecting the driven shaft with both the tray and the counterweight.

37. The differential impulse conveyor as defined in claim 31, wherein the connector includes a cable assembly powered by the driven shaft and interconnecting the driven shaft with both the tray and the counterweight.

* * * * *